United States Patent Office 3,367,914
Patented Feb. 6, 1968

3,367,914
POLY(AMINOMETHYL)DIPHENYL ETHER-ALDE-
HYDE THERMOSET RESIN AND PROCESS OF
MAKING SAME
Norman T. Herbert, Bay City, Mich., assignor to The Dow Chemical Company, Midland, Mich., a corporation of Delaware
No Drawing. Filed June 29, 1964, Ser. No. 379,026
6 Claims. (Cl. 260—52)

ABSTRACT OF THE DISCLOSURE

Thermosetting resinous materials having melting points in the range from 150° to 350° C. are made by heating at a temperature of −10° to 100° C. for 5–30 minutes, an aldehyde such as formaldehyde, acetaldehyde, etc., with a mixture of poly(aminomethyl) diphenyl ethers having an average of from about 1.5 to 4.0 aminomethyl groups. After the resins are cured under pressure at or above the melting point, they form adherent tough films on metal substrates and thus are useful as wire coatings for electrical magnet wire for high temperature service i.e. 180° C. or higher.

This invention relates to thermosetting resins and to a process of preparing the same. In particular, this invention relates to the process of reacting a poly(aminomethyl) diphenyl ether with an aldehyde and the product thus obtained.

The present invention has for one of its objects the provision of novel polymeric substances.

Another object is to provide new compounds which are suitable for use as high temperature coating materials.

A further object of the invention is to provide thermally stable thermosetting compositions which may be heat cured without the use of specialized curing techniques and which are flexible over wide temperature ranges. Other objects will appear hereinafter.

The polymers contemplated within the scope of the present invention are formed by heating an aldehyde with a poly(aminomethyl) diphenyl ether containing an average of from 1.5 to 4.0 aminomethyl groups with a preferred average being 1.85 aminomethyl groups and having the formula

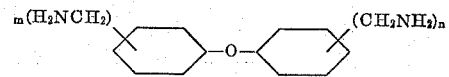

wherein $m$ is a number from 1 to 2 and $n$ is a number from 0 to 2.

The poly(aminomethyl) diphenyl ethers are obtained by the ammoniation of poly(halomethyl) diphenyl ethers such as poly(chloromethyl) diphenyl ether (CMDPE) by methods known to the art, as for example the use of a large excess of ammonia as described in U.S. 2,640,080.

The poly(halomethyl) diphenyl ethers utilized as starting materials in the synthesis of the poly(aminomethyl) diphenyl ethers described herein are well-known materials that are readily obtained by the chloromethylation or bromomethylation of diphenyl ether, preferably as described by Doedens in United States Patent 2,911,380. Since halomethylation occurs largely at the 2 and 4 positions of each aromatic ring, the crude poly(halomethyl) diphenyl ether thereby obtained is predominately a mixture of isomers and homologs having from 1 to 4 halomethyl groups per diphenyl ether moiety. The exact composition is dependent upon reaction conditions, and particularly on the proportion of halomethylating agent employed.

For use in the preparation of the poly(aminomethyl) diphenyl ethers used for the preparation of the thermosetting compositions described herein, individual poly(halomethyl) diphenyl ethers having from 1.5 to 4 halomethyl groups per diphenyl ether moiety can be easily isolated and purified from the crude reaction product. Particularly desirable are poly(aminomethyl) diphenyl ethers prepared from the 4,4'-bis(halomethyl) diphenyl ethers which are recovered in high yields from crude halomethylation products by the process described by Doedens and Rosenbrock in United States Patent 3,004,072. Examples of other purified poly(halomethyl) diphenyl ethers which can be ammoniated and employed in the preparation of poly(aminomethyl) diphenyl ethers used for the preparation of the compositions described herein include 2,4,4'-tris (chloromethyl) diphenyl ether, 4-(bromomethyl) diphenyl ether, and 4,4'-bis(bromomethyl) diphenyl ether.

Particularly satisfactory compositions are often obtained from an ammoniated crude mixture having an average of about 2 halomethyl groups per diphenyl ether moiety. For example, valuable products are obtained using a poly(aminomethyl) diphenyl ether prepared by ammoniation of crude poly(chloromethyl) diphenyl ether (CMDPE) containing 25.2 weight percent chlorine and having an average of 1.85 chloromethyl groups ($ClCH_2$—) per diphenyl ether (DPE) moiety. Typical compositions of these crude poly(chloromethyl) diphenyl ethers are given in Table I.

TABLE I.—TYPICAL POLY(CHLOROMETHYL) DIPHENYL ETHER COMPOSITIONS

| CMDPE— | 25 | 32 |
|---|---|---|
| Wt. percent Cl | 25.2 | 32.0 |
| Mole Ratio, $ClCH_2$—/DPE | 1.85 | 2.80 |
| Composition (mole percent): | | |
| 2-chloromethyl DPE | 0.3 | 0 |
| 4-chloromethyl DPE | 2.4 | 0 |
| 2,4'bis(chloromethyl) DPE | 17.7 | 1.9 |
| 4,4'bis(chloromethyl) DPE | 68.5 | 8.6 |
| Tris(chloromethyl) DPE | 10.5 | 89.0 |
| Tetrakis(chloromethyl) DPE | 1.0 | 2.0 |

Aldehydes which may be reacted with the poly(aminomethyl) diphenyl ethers prepared from the poly(halomethyl) diphenyl ethers described above to prepare the thermosetting resins of the present invention include formaldehyde, acetaldehyde, butaldehyde and crotonaldehyde.

The polymers are usually prepared by mixing the poly(aminomethyl) diphenyl ether and the aldehyde in a suitable reaction vessel. The reactants are suitably reacted in the presence of a diluent, although the use of a diluent is not essential. Suitable diluents or solvents for the reactants include water, aliphatic alcohols such as ethanol, chlorinated hydrocarbons such as methylene chloride and aromatic hydrocarbons such as toluene. The reaction can be conducted at temperatures ranging from about −10° to 100° C. for periods of time ranging from about 5 to 30 minutes or longer. Such reaction times are also dependent, as will be apparent to those skilled in the art, upon the solvent utilized and the temperature employed in the reaction.

The molar ratio of the poly(aminomethyl) diphenyl ether to aldehyde used in preparing the polymers of the present invention may vary over a wide range generally from about 1:1 to 1:10, preferably from about 1:1 to 1:3. At the higher molar ratios of aldehyde to poly(aminomethyl) diphenyl ether, the polymer forms more rapidly and the thermal stability of the resultant thermosetting resin is significantly increased.

In addition, the manner by which the reactants are added to the reaction vessel has a significant influence on the resultant polymer properties. Although either reactant may be added to the reaction vessel in any manner, it is highly desirable and preferable that the aldehyde be added to the poly(aminomethyl) diphenyl ether rather than the reverse. When the aldehyde is added to the ether, it has been found that the resultant thermosetting resins have superior resistance to degradation at elevated temperatures.

The polymers of this invention are thermosetting resinous materials having high melting points, that is, about 150° to 350° C. The resins may be cured at temperatures at or above the melting points of the resins to form adherent, tough, opaque, flexible, thermally stable films and coatings which are insoluble in water and organic solvents. The polymers may be applied as protective coatings to a varied number of suitable substrates, such as copper and aluminum in the molten state or they may be applied to such substrates as solutions of the polymers in organic solvents such as diphenyl oxide, acetic acid and furfuryl alcohol. Because of their high thermal stability and flexibility, the resins may be used as electrical magnet wire coatings employed for high temperature service, e.g. 180° C. Class H service or greater. The resins are readily coated on copper wire by simply passing the wire through a solution of the resin and thereafter running it through a heated tower.

While the invention is susceptible to considerable variation and modification in the manner of its practical application, particularly as regards the kind and amount of reactants and the conditions of reaction such as temperature and solvents employed, the following examples will serve to illustrate how the thermosetting polymers of the present invention are prepared.

*Example 1*

To a reaction flask equipped with a high speed agitator, condenser and thermowell was added 122 grams (0.535 mole) 4,4′-bis(aminomethyl) diphenyl ether along with 500 milliliters of water. To the flask was then added 162 grams of a 37 percent aqueous solution of formaldehyde (1.975 moles), the pH of which was adjusted to 7.5–7.7 with 0.1 N NaOH. The formaldehyde was added to the water at 25° C. over a 10 minute period. The flask was heated 15 minutes at 100° C. whereupon the mixture was cooled, filtered and washed with ethanol. A cream colored solid crystalline product was recovered which had a melting point of approximately 350° C. About 4 grams of the solid, when heated under 2000 p.s.i. pressure at 110° C. for 10 minutes, cured to a clear tough, flexible thermoset film.

*Example 2*

The procedure of Example 1 was repeated with the exception that the ratio of reactants was varied and 700 milliliters water was used as a solvent for the reaction. Reaction temperatures used varied from about 50°–95° C. The molar ratios of the reactants and the properties of the products obtained are listed in Table II below. These products cured to tough, flexible, thermoset resins by the application of heat in the range of 150° to 200° C. concurrently with the application of pressures in the range of 500 to 2000 p.s.i.

TABLE II

| Sample No. | Molar Ratio [1] | Reaction Temp., °C. | Color of Product | Melting Point, °C. | Thermosetting Temp., °C. |
|---|---|---|---|---|---|
| 1 | 1:3.7 | 50–60 | White | ([2]) | 250 |
| 2 | 1:3.7 | 90–95 | Cream | 200 | 235 |
| 3 | 1:4.0 | 78–90 | ----do---- | ([2]) | 240 |

[1] 4,4′-bis(aminomethyl)diphenyl ether to formaldehyde.
[2] Not determined.

*Example 3*

To a reaction flask equipped with a high speed agitator, condenser and thermowell was added 162 grams of a 37 percent (aqueous) solution of formaldehyde (1.975 moles), the pH adjusted to 7.5–7.7 with 0.1 N NaOH, along with 1 liter of water. The temperature of the reaction mixture was lowered to 17° C. by immersion of the flask in an ice bath. A solution of 122 grams of 4,4′-bis(aminomethyl) diphenyl ether (0.5 mole) dissolved in one liter ethanol was added to the cooled reaction mixture. Upon addition of the ether solution, a thick emulsion formed and stirring was allowed to continue an additional 10 minutes after addition. The emulsion was then filtered and a white solid having a melting point greater than 200° C. was recovered. The solid was polymerized to a tough flexible thermoset resin by heating it at a temperature of 200° C. and at a pressure of 1000 p.s.i.

*Example 4*

The procedure of Example 3 was repeated with the exception that the molar ratio of the reactants was varied. The reaction temperatures were maintained at about 17°–22° C. The molar ratio of reactants employed and the properties of the polymeric resins thereby obtained are listed in Table III below. These products cured to tough, flexible, thermoset resins by the application of heat in the range of 200° to 350° C. concurrently with the application of pressures in the range of 500 to 3000 p.s.i.

TABLE III

| Sample No. | Molar Ratio [1] | Color of Product | Melting Point, °C. | Thermosetting Temp., °C. |
|---|---|---|---|---|
| 1 | 1:2.0 | White | 350 | 180° C. under pressure of 2,000 p.s.i. |
| 2 | 1:3.7 | ----do---- | 350 | Do. |
| 3 | 1:4.0 | ----do---- | ([2]) | ([2]). |
| 4 | 1:10.0 | ----do---- | ([2]) | ([2]). |

[1] 4,4′-bis(aminomethyl)diphenyl ether to formaldehyde.
[2] Not determined.

*Example 5*

To a flask equipped with a thermometer and mechanical stirrer was added a solution of 4.06 grams (0.05 mole) formaldehyde dissolved in 100 milliliters of water, the pH of which was adjusted to 7.5–7.8 with 0.1 N NaOH. The formaldehyde solution was cooled to 15°–18° C. by means of an ice bath and 12.2 grams (0.0535 mole) 4,4′-bis(aminomethyl) diphenyl ether dissolved in 100 milliliters ethanol was added to the cooled formaldehyde solution over a period of 4 minutes. The resulting precipitate was filtered and a white colored crystalline product was recovered. This product was cured to a tough flexible thermoset resin by heating at 180° C. and 2000 p.s.i. pressure. The cured product was then tested for heat stability at 500° F. in a forced air oven for 500 hours. After the 500 hour testing period, it was determined that the polymer had undergone a weight loss of 38.8 percent. The testing procedure described above was repeated with resins prepared by varying the molar ratios of the formaldehyde to 4,4'-bis(aminomethyl) diphenyl ether over a range of 1 to 6. The weight loss which these polymers underwent over a 500 hour period at 500° F. is summarized in Table IV below.

TABLE IV

| Run No. | Molar Ratio, aldehyde/ether | Percent weight loss at 500° F. for 500 hours |
|---|---|---|
| 1 | 1:1 | 38.8 |
| 2 | 2:1 | 38.0 |
| 3 | 3:1 | 35.0 |
| 4 | 4:1 | 25.0 |
| 5 | 5:1 | 21.5 |
| 6 | 6:1 | 25.0 |

*Example 6*

The procedure of Example 5 was repeated with exception that the formaldehyde solution (1.98 formaldehyde) was added to the 4,4'-bis(aminomethyl) diphenyl ether (0.535 mole) at a temperature of 50°–60° C.

When the product of this reaction was converted to a thermoset resin and the resin exposed to 500° F. for 500 hours, the resin encountered a weight loss of 14.75 percent.

By way of contrast, 4,4'-bis(aminomethyl) diphenyl ether (0.535 mole) was reacted with formaldehyde (1.94 moles) following the procedure of Example 6. The resultant solid product was cured to a thermoset resin which when exposed to 500° F. for 500 hours, underwent a weight loss of 60 percent.

*Example 7*

Following the procedure of Example 3, 324 grams (4 moles) of a 37 percent aqueous solution of formaldehyde the pH adjusted to 7.5 with 0.1 N NaOH was added to an aqueous solution of 1400 milliliters water and two hundred forty-six grams (1 mole) poly(aminomethyl) diphenyl ether prepared from the ammoniation of CMDPE–25. The mixture was reacted over temperature range of 70°–90° C. for about a 20 minute period. The resultant product was a tan flake which melted and was soluble in hot (200° C.) diphenyl oxide. When the product of this reaction was converted to a thermoset polymer following the procedure of Example 6 and exposed to 500° F. for 500 hours it underwent a 9 percent weight loss.

In place of the poly(aminomethyl) diphenyl ether prepared from ammoniated CMPDE–25 used in the reaction of the above example, there can be be substituted any equivalent amount of ammoniated poly(chloromethyl) diphenyl ether mentioned above and in place of the formaldehyde of the above example there can be substituted any equivalent amount of the other mentioned aldehydes such as acetaldehyde, butaldehyde, crotonaldehyde, to obtain film-forming thermosetting resinous products generally similar to those obtained in the above example.

*Example 8*

A resin prepared by reacting 0.055 mole 4,4'-bis-(aminomethyl) diphenyl ether with 0.199 mole formaldehyde at a temperature of 50°–60° C. according to the procedure of Example 1 was dissolved in diphenyloxide to form a 20 percent solution and was used to coat a Number 18 copper wire by running the copper wire over a pair of half submerged pulleys in a tank containing the resin solution and thereafter passing the coated wire through a 10 foot x 12 inch heating tower at a temperature of 450° C. to cure and dry the coating. Upon emerging from the tower a smooth flexible coating was obtained. Six passes of the wire were made through the resin solution and heating tower at various wire speeds to obtain a 3 mil buildup of the resin on the wire.

To determine whether the coated wire was suitable for use as magnet wire coating the following physical tests were run.

Abrasion Resistance Test (NEMA MW–15–5.2.3).—In this test a steel needle under a pressure of 700 grams scrapes the wire at right angles at three places around the diameter. An electrical current flowing through the wire detects and registers failure. The test indicates the ability of the wire insulation to withstand the mechanical abrasion in production winding and assembly operations.

Flexibility Test (NEMA MW–5–5.2.1).—In this test the coated wire sample is elongated about 15–30 percent and then wrapped about its own diameter (referred to as 1× mandrel). The coated wire is then examined for cracks. To be suitable for magnet wire service, the coated wire should not exhibit any cracks when so tested.

The abrasion resistance and flexibility properties of the coated wire are summarized in Table V below.

TABLE V

| Sample No. | Wire Speed, ft./min. | Final Coated wire diameter (in.) | Abrasion Resistance (strokes average) | Flexibility |
|---|---|---|---|---|
| 1 | 18 | .0435 | 46 | No cracks, 1× mandrel at 15–20% elongation. |
| 2 | 22 | .0427 | 20 | No cracks, 1× mandrel at 30% elongation. |
| 3 | 30 | .0430 | 6 | Do. |

*Example 9*

The resin of Example 7 was coated on a No. 18 copper wire pursuant to the procedure employed in Example 8. The abrasion resistance and flexibility properties of the coated wire are summarized in Table VI below.

TABLE VI

| Sample No. | Wire Speed, ft./min. | Final Coated wire diameter (in.) | Abrasion Resistance (strokes average) | Flexibility |
|---|---|---|---|---|
| 1 | 20 | .0429 | 23 | No cracks, 1× mandrel at 15–20% elongation. |
| 2 | 24 | .0437 | 39 | No cracks, 1× mandrel at 10–15% elongation. |

What is claimed is:

1. A thermosetting resin which comprises the reaction product of an aldehyde with 4,4'-bis(aminomethyl)diphenyl ether.

2. A thermosetting resin which comprises the reaction product of an aldehyde with a poly(aminomethyl)diphenyl ether containing an average of about 1.85 aminomethyl groups.

3. A thermosetting resin which comprises the reaction product of 4,4'-bis(aminomethyl) diphenyl ether with formaldehyde, the molar ratio of the 4,4'-bis(aminomethyl) diphenyl ether to formaldehyde being in the range of from 1:1 to 1:3.

4. A process for producing thermally stable thermosetting resins which comprises heating at a temperature of about —10° to about 100° C.
 (a) an aldehyde
 (b) 4,4'-bis(aminomethyl)diphenyl ether.

5. A process for producing thermally stable thermosetting resins which comprises heating at a temperature of about —10° to about 100° C.

(a) an aldehyde
(b) poly(aminomethyl)diphenyl ether having an average of about 1.85 aminomethyl groups and having the formula

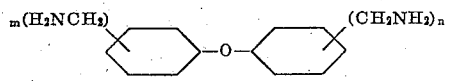

wherein $m$ is a number from 1 to 2 and $n$ is a number from 0 to 2, the molar ratio of poly(aminomethyl) diphenyl ether to aldehyde being in the range 1:1 to 1:10.

6. A process for producing thermally stable thermosetting resins which comprises heating formaldehyde with 4,4'-bis(aminomethyl) diphenyl ether at a temperature of about $-10°$ to about $100°$ C., the molar ratio of 4,4'-bis-(aminomethyl) diphenyl ether to formaldehyde being in the range of from 1:1 to 1:10.

References Cited
UNITED STATES PATENTS

| | | | |
|---|---|---|---|
| 2,441,576 | 5/1948 | Jones et al. | 260—570.9 |
| 3,219,628 | 11/1965 | Doedens et al. | 260—61 |
| 3,128,259 | 4/1964 | Sonnabend | 260—18 |
| 3,182,085 | 5/1965 | Pitchforth | 260—570.9 |

WILLIAM H. SHORT, *Primary Examiner.*

H. SCHAIN, *Assistant Examiner.*

UNITED STATES PATENT OFFICE
CERTIFICATE OF CORRECTION

Patent No. 3,367,914                      February 6, 1968

Norman T. Hebert

It is certified that error appears in the above identified patent and that said Letters Patent are hereby corrected as shown below:

In the heading to the printed specification, line 5, "Norman T. Herbert" should read -- Norman T. Hebert --.

Signed and sealed this 3rd day of March 1970.

(SEAL)
Attest:

Edward M. Fletcher, Jr.                        WILLIAM E. SCHUYLER, JR.
Attesting Officer                                Commissioner of Patents